US011810430B2

(12) United States Patent
Suzuki et al.

(10) Patent No.: US 11,810,430 B2
(45) Date of Patent: Nov. 7, 2023

(54) INFORMATION PROCESSING DEVICE, INFORMATION PROCESSING METHOD, AND PROGRAM

(71) Applicant: KEYCOM Corporation, Tokyo (JP)

(72) Inventors: Hirosuke Suzuki, Tokyo (JP); Katsuya Nagafusa, Tokyo (JP)

(73) Assignee: KEYCOM Corporation, Tokyo (JP)

( * ) Notice: Subject to any disclaimer, the term of this patent is extended or adjusted under 35 U.S.C. 154(b) by 0 days.

(21) Appl. No.: 18/080,181

(22) Filed: Dec. 13, 2022

(65) Prior Publication Data

US 2023/0186733 A1 Jun. 15, 2023

(30) Foreign Application Priority Data

Dec. 14, 2021 (JP) ................................ 2021-202821
Jun. 30, 2022 (JP) ................................ 2022-105222

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3288* (2013.01); *G07F 17/3272* (2013.01)

(58) Field of Classification Search

CPC ... G07F 17/32; G07F 17/3211; G07F 17/3214
USPC .............................. 463/1, 20, 22, 25, 29, 30
See application file for complete search history.

(56) References Cited

U.S. PATENT DOCUMENTS

2008/0139263 A1* 6/2008 He .......................... G07F 17/32 463/6
2022/0323855 A1* 10/2022 Khare .................. A63F 13/216

FOREIGN PATENT DOCUMENTS

| | | | |
|---|---|---|---|
| JP | 2009-140187 | A | 6/2009 |
| JP | 2009-532786 | A | 9/2009 |
| JP | 2019-032648 | A | 2/2019 |
| KR | 10-2019-0127196 | A | 11/2019 |

OTHER PUBLICATIONS

Japanese Office Action mailed by Japanese Patent Office dated Aug. 2, 2022, in corresponding Japanese patent application No. 2022-105222.

* cited by examiner

*Primary Examiner* — Adetokunbo O Torimiro
(74) *Attorney, Agent, or Firm* — IP BUSINESS SOLUTIONS, LLC

(57) ABSTRACT

There is provided an information processing device that enables the purchase of a betting ticket at a timing when a desire to purchase increases according to the situation of the competition after the start of the competition. An information processing device includes: a competition situation acquisition unit that acquires a competition situation before and after the start of a competition between a plurality of competitors; a betting time setting unit that sets a betting time by setting a betting start trigger and a betting end trigger from a time when it is determined whether or not an order-of-finish determination part of any one of the plurality of competitors has reached a front to a predetermined time after the start of the competition; and a betting ticket purchase receiving unit that receives a purchase of a betting ticket within the set betting time.

10 Claims, 5 Drawing Sheets

INFORMATION PROCESSING DEVICE, INFORMATION PROCESSING METHOD, AND PROGRAM

CROSS-REFERENCE TO RELATED APPLICATIONS

The present application claims priority under 35 U.S.C. 119 to Japanese Patent Application No. 2021-202821, filed on Dec. 14, 2021 and Japanese Patent Application No. 2022-105222, filed on Jun. 30, 2022. The contents of these applications are incorporated herein by reference in their entirety.

BACKGROUND OF THE INVENTION

Field of the Invention

The present invention relates to an information processing device, an information processing method, and a program for receiving the purchase of a betting ticket for a competition between competitors.

Description of the Related Art

There has been known a system that enables the purchase of a betting ticket for a public competition or the like between competitors through a mobile terminal before the start of the competition. Here, the public competition refers to a competitive game such as a horse race, a bicycle race, a boat race, and an auto race. In addition, in recent years, information processing technology that enables the purchase of a betting ticket after the start of the competition is under development.

For example, JP 2019-032648 A discloses an information processing device that receives the purchase of a betting ticket for a competitive game between three or more competitors and that includes a betting ticket purchase receiving means for receiving the purchase of the betting ticket through an information processing terminal after the start of the competitive game and a payout ratio calculation means for changing the payout ratio of the betting ticket over time based on the elapsed time from the start of the competitive game.

In addition, US Patent Application Publication No. 2008/0139263 discloses an information processing device that divides a race into four time segments based on time and receives betting in any or all of the time segments thereof during the race. In addition, Korean Patent Publication No. 10-2019-0127196 discloses an information processing device that predicts the result of an ongoing baseball game by using the past game data and the data of the ongoing baseball game.

SUMMARY OF THE INVENTION

In the information processing devices disclosed in JP 2019-032648 A, US Patent Application Publication No. 2008/0139263, and Korean Patent Publication No. 10-2019-0127196, however, a betting ticket can be purchased at any time before the end of the reception time set between the start of the competition and the end of the competition. Therefore, it is possible to purchase a betting ticket even if a betting person does not watch the entire competition. For this reason, it is difficult for the betting person to become immersed in the competition and to increase a desire to purchase the betting ticket at the highlight of the competition according to the situation of the competition.

Therefore, in view of the aforementioned problems, the main object of the present invention is to provide an information processing device that enables the purchase of a betting ticket at a timing when a desire to purchase increases according to the situation of the competition after the start of the competition.

In order to solve the aforementioned problems, an information processing device according to the present invention includes: a competition situation acquisition unit that acquires a competition situation before and after the start of a competition between a plurality of competitors; a betting time setting unit that sets a betting time by setting a betting start trigger and a betting end trigger from a time when it may be determined whether or not an order-of-finish determination part of any one of the plurality of competitors has reached a front to a predetermined time after the start of the competition; and a betting ticket purchase receiving unit that receives a purchase of a betting ticket within the set betting time.

In addition, an information processing method according to the present invention includes: a competition situation acquisition step for acquiring a competition situation before and after the start of a competition between a plurality of competitors; a betting time setting step for setting a betting time by setting a betting start trigger and a betting end trigger from a time when it may be determined whether or not an order-of-finish determination part of any one of the plurality of competitors has reached a front to a predetermined time after the start of the competition; and a betting ticket purchase receiving step for receiving a purchase of a betting ticket within the set betting time.

In addition, a program according to the present invention causes a computer to execute an information processing method including: a competition situation acquisition step for acquiring a competition situation before and after the start of a competition between a plurality of competitors; a betting time setting step for setting a betting time by setting a betting start trigger and a betting end trigger from a time when it may be determined whether or not an order-of-finish determination part of any one of the plurality of competitors has reached a front to a predetermined time after the start of the competition; and a betting ticket purchase receiving step for receiving a purchase of a betting ticket within the set betting time.

According to the information processing device of the present invention, it is possible to provide an information processing device that enables the purchase of a betting ticket at a timing when a desire to purchase increases according to the situation of the competition after the start of the competition. In addition, the effect described herein is not necessarily restrictive, and any effect described in this specification may be the effect of the present invention.

DETAILED DESCRIPTION OF THE INVENTION

Hereinafter, preferred embodiments for carrying out the present invention will be described with reference to the drawings. In addition, the embodiments described below are examples of a representative embodiment of the present invention, and the scope of the present invention is not limited thereby, and various combinations, variations, and modifications can be made within the scope of the gist of the present invention.

First Embodiment

Hereinafter, a first embodiment of the present invention will be described with reference to FIGS. 1 to 4.

<1-1. Configuration of Information Processing System>

Figure 1:
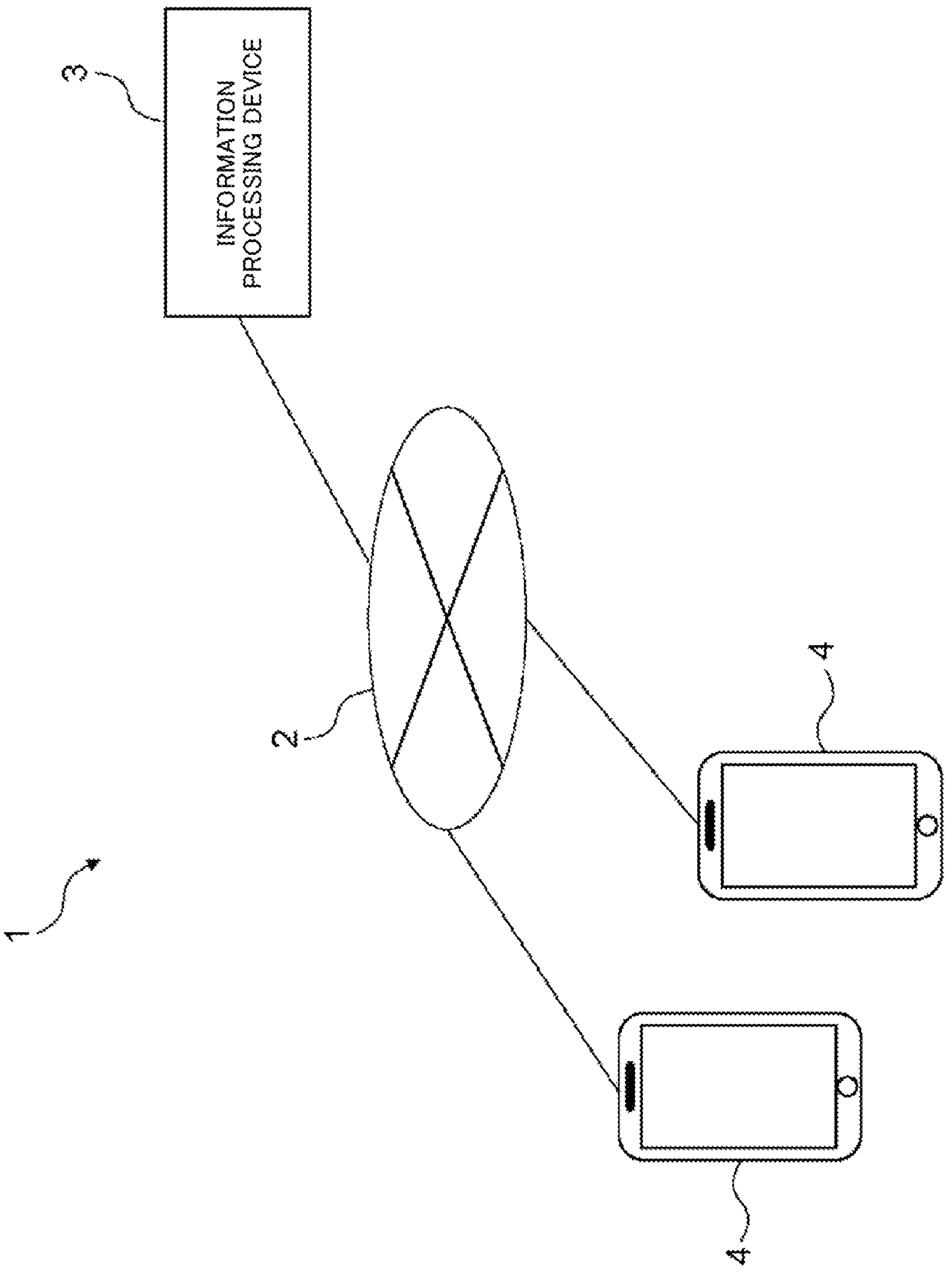
FIG. 1 is a schematic configuration diagram showing an information processing system according to a first embodiment of the present invention.

First, an information processing system 1 according to the first embodiment of the present invention will be described with reference to FIG. 1. FIG. 1 is a schematic configuration diagram showing the information processing system 1 according to the present embodiment. The information processing system 1 includes a network 2, a server 3 that is an information processing device, and a terminal device 4 such as a mobile terminal.

The network 2 is, for example, a computer network or a communication network through which a plurality of computers, electronic devices, and the like are connected to each other so that signals, data, and information can be transmitted and received therebetween.

The server 3 is an information processing device that receives, through the network 2, the purchase of a betting ticket for a competitive game (hereinafter, also referred to as a "race") between competitors. In addition, the competitive game according to the present embodiment is, for example, a horse race, the competitor is a racehorse, and the betting ticket is a so-called horse-race betting ticket. In addition, the competitive game between three or more competitors is not limited to the horse race, and may be a bicycle race, a boat race, an auto race, track and field events, and the like.

The server 3 may receive information regarding a race, such as information regarding racehorses, jockeys, and racetracks, from another information processing device as necessary. In addition, the server 3 may transmit information input by a betting person (hereinafter, referred to as a "user") through the terminal device 4, such as information regarding a betting ticket purchased by the user or a user identification (ID), to another information processing device as necessary.

The terminal device 4 is, for example, an information processing terminal such as a smartphone, a tablet terminal, or a notebook computer. The terminal device 4 includes a display for displaying images. The user predicts the order of finish of the race and purchases a betting ticket through the terminal device 4.

In order for the user to purchase a betting ticket through the server 3, for example, dedicated application software (hereinafter, referred to as an "application") is installed on the terminal device 4. Then, the user causes the terminal device 4 to access the server 3 by activating the application on the terminal device 4. When the terminal device 4 accesses the server 3, input of the user ID registered in advance is requested.

Then, the user purchases a betting ticket through the terminal device 4 that has accessed the server 3. When the purchased betting ticket hits the race result, the user receives a payout based on the payout ratio (hereinafter, referred to as "odds"). In addition, the purchase of a betting ticket is charged, and the payout is given, for example, in money. For this reason, the user ID is associated with, for example, the user's credit card number, bank account number for settlement, or the like.

<1-2. Server Configuration>

Figure 2:
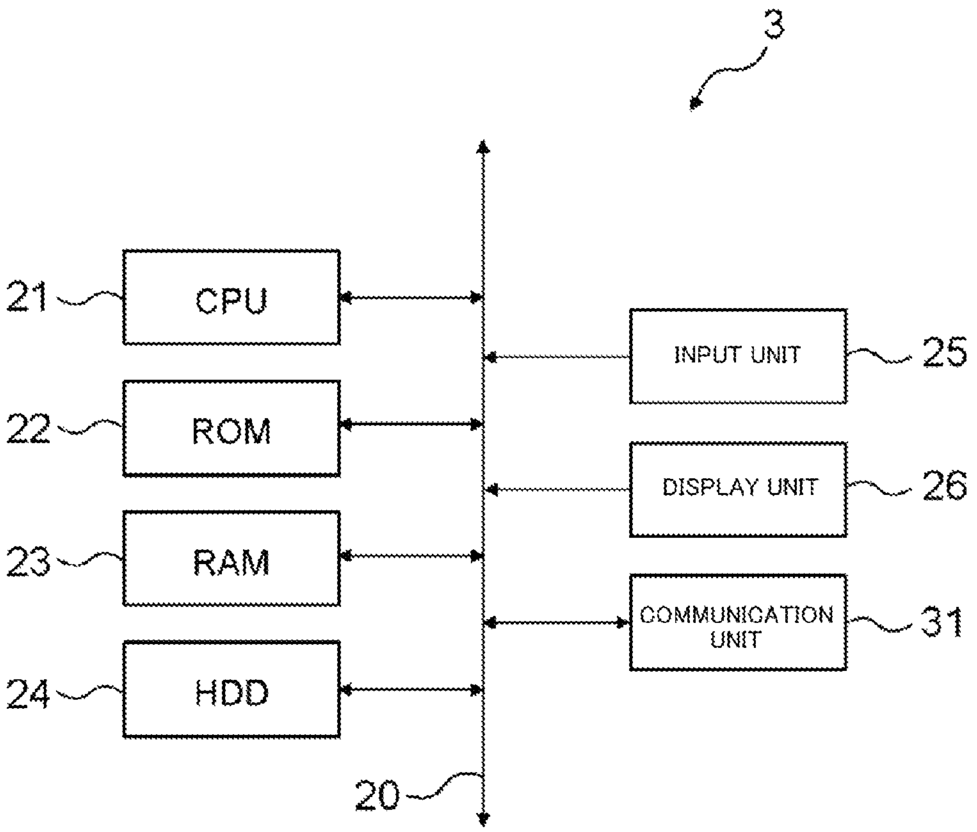
FIG. 2 is a block diagram showing the electrical configuration of a server according to the first embodiment of the present invention.

Next, the electrical configuration of the server 3 according to the present embodiment will be described with reference to FIG. 2. FIG. 2 is a block diagram showing the electrical configuration of the server 3 according to the present embodiment.

The server 3 includes a central processing unit (CPU) 21 as a main control unit that controls the overall operation of the server 3, a read only memory (ROM) 22 in which various programs and various kinds of data are stored in advance, a random access memory (RAM) 23 used as a work area and the like when various programs are executed by the CPU 21, and a hard disk drive (HDD) 24 as a storage means for storing various programs and various kinds of data.

The HDD 24 stores various kinds of information regarding the race, information regarding the betting ticket purchased by the user through the terminal device 4, the registered user ID, and the like. In addition, the storage means is not limited to the HDD 24, and may be another storage medium such as a semiconductor memory, for example, a flash memory.

In addition, the server 3 includes an input unit 25 configured by a keyboard, a mouse, and the like to receive the input of various operations, a display unit 26 such as a liquid crystal display device for displaying various images, and a communication unit 31 that is connected to another information processing device, such as the terminal device 4, through the network 2 and that transmits and receives various kinds of data to and from another information processing device.

The CPU 21, the ROM 22, the RAM 23, the HDD 24, the input unit 25, the display unit 26, and the communication unit 31 are electrically connected to each other through a system bus 20. Therefore, the CPU 21 can access the ROM 22, the RAM 23, and the HDD 24, grasp the operation state of the input unit 25, display images on the display unit 26, and transmit and receive various kinds of data to and from another information processing device or the like through the communication unit 31.

<1-3. Information Processing Function of Server>

Figure 3:
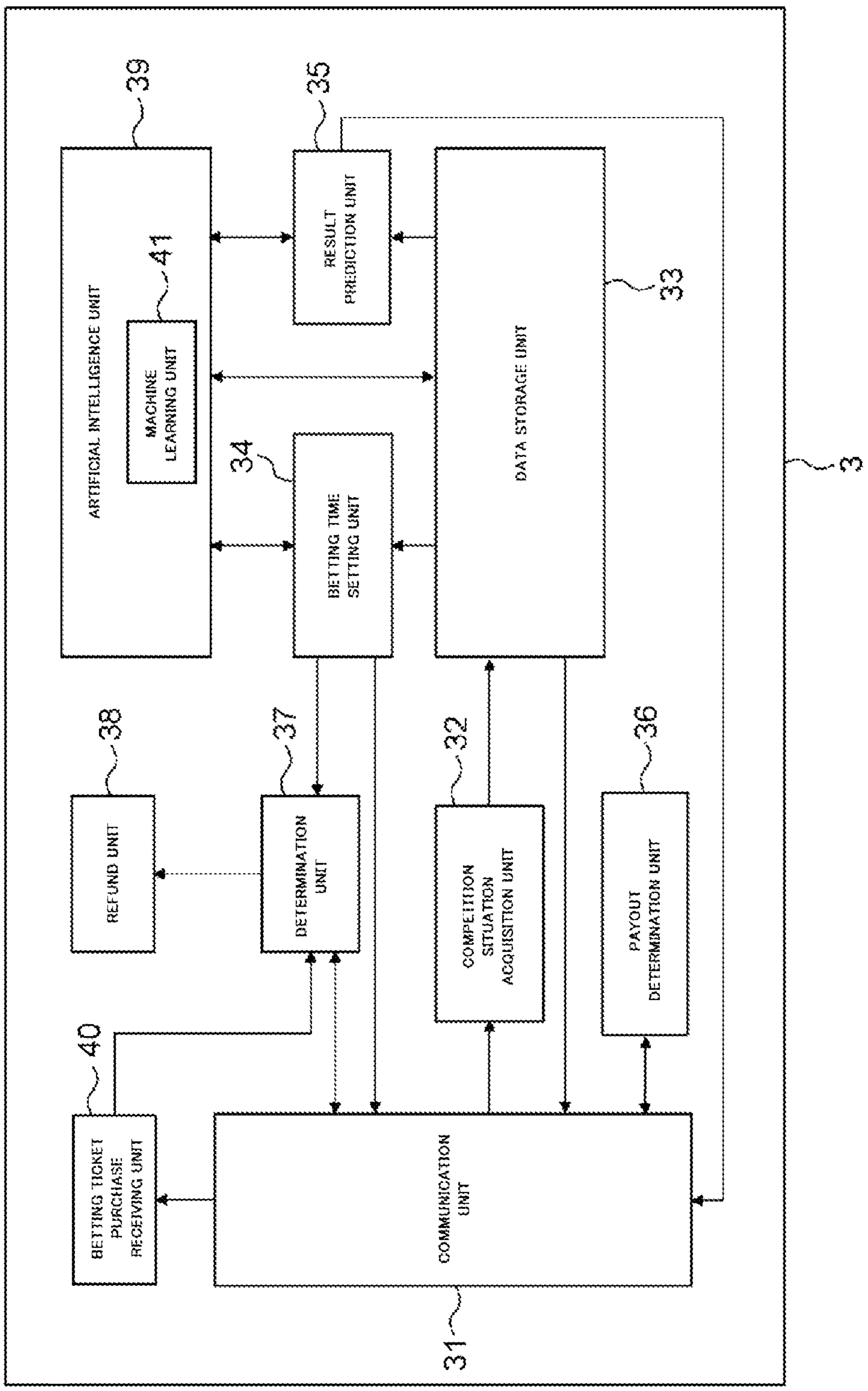
FIG. 3 is a functional block diagram showing the functional configuration of the server according to the first embodiment of the present invention.

Next, an information processing function of the server 3 according to the present embodiment will be described with reference to FIG. 3. FIG. 3 is a functional block diagram regarding the information processing function of the server 3 according to the present embodiment.

The CPU 21 provided in the server 3 includes a competition situation acquisition unit 32, a betting ticket purchase receiving unit 40, a betting time setting unit 34, a result prediction unit 35, a payout determination unit 36, a determination unit 37, a refund unit 38, and an artificial intelligence unit 39. In addition, the HDD 24 includes a data storage unit 33. Each function of the CPU 21 is implemented by a program stored in the HDD 24.

The competition situation acquisition unit 32 acquires a competition situation such as a situation of a plurality of competitors before and after the start of the race. For example, in the case of a horse race, the competition situation includes racehorse information, jockey information, racetrack information, race information, and the like.

The betting ticket purchase receiving unit 40 receives the purchase of a betting ticket through the terminal device 4 within the set betting time. The betting ticket purchase receiving unit 40 according to the present embodiment receives the purchase of a betting ticket through the terminal device 4 before and after the start of the race. That is, in the information processing system 1 according to the present embodiment, the user can purchase a betting ticket even after the race has started, so that the degree of freedom of timing for the user to purchase a betting ticket is increased. In addition, the betting ticket purchase receiving unit 40 performs settlement for the betting ticket purchased by the user.

In addition, the betting ticket purchase receiving unit 40 according to the present embodiment cannot change the betting ticket purchased before the start of the race after the start of the race. In addition, the betting ticket purchase receiving unit 40 can receive the purchase of a betting ticket after the start of the race not only for single wins but also for multiple wins in which the order of finish of a plurality of racehorses is predicted.

The betting time setting unit 34 sets a betting start trigger and a betting end trigger from the time when it can be determined whether or not an order-of-finish determination part of any one of a plurality of competitors has reached the front to a predetermined time after the start of the race, thereby setting the betting time based on the competition situation. The betting time during which the purchase of a betting ticket is received is a time from the start of the race to the end of the race, and is a period of time from the time when the betting start trigger is set to the time when the betting end trigger is set.

Here, the "order-of-finish determination part of the competitor" refers to, for example, the position of the tip of the horse's nose in the case of a horse race, and the rearmost position of the sleigh pulled by the horse in the case of a Banei horse race. In addition, in a bicycle race, a boat race, and an auto race, the "order-of-finish determination part of the competitor" refers to the position of the tip of the competitor (bicycle, boat, or race car), for example. In this manner, the order-of-finish determination part of the competitor is determined according to the type of a competition, such as a public competition.

In addition, the "time when it can be determined whether or not the order-of-finish determination part of the competitor has reached the front" refers to a point in time when the order of the competitors can be temporarily determined. Specifically, in a horse race, the "time when it can be determined whether or not the order-of-finish determination part of the competitor has reached the front" refers to, for example, when the leading horse and any of the second and subsequent horses are away from each other by the tip of the horse's nose, when the leading horse and any of the second and subsequent horses are away from each other by one head, when the leading horse and any of the second and subsequent horses are away from each other by half the length of one horse, or when the leading horse and any of the second and subsequent horses are away from each other by the length of one horse. On the other hand, in a bicycle race, a boat race, and an auto race, the "time when it can be determined whether or not the order-of-finish determination part of the competitor has reached the front" refers to, for example, when the leading competitor and any of the second and subsequent competitors are away from each other by half a wheel, when the leading competitor and any of the second and subsequent competitors are away from each other by one wheel, when the leading competitor and any of the second and subsequent competitors are away from each other by half the length of the competitor, or when the leading competitor and any of the second and subsequent competitors are away from each other by the full length of the competitor.

The "time when it can be determined whether or not an order-of-finish determination part of any one of a plurality of competitors has reached the front" is not limited to "when the order-of-finish determination part of the competitor reaches the front first", and may be determined at any time during the race. For example, whether or not the order-of-finish determination part of the competitor has reached the front can be determined after a competitor who reached the front first is overtaken by competitors running second or later. In the case of a lap race, whether or not the order-of-finish determination part of the competitor has reached the front can be determined at any lap after the second lap without being limited to the first lap, or can be determined after entering the final lap.

In addition, for example, in a bicycle race, whether or not the order-of-finish determination part of the competitor has reached the front can be determined after a "line" such as a team that the players temporarily form during the race is formed or after the bell called "Jan" rings.

In addition, the time when the order-of-finish determination part of the competitor has reached the front can be determined by focusing on which position of the inside, the center, and the outside of the course the competitor is running on. For example, in a boat race, (1) when boats line up in a straight line immediately after the start of the race, "Nige" or "Sasi" (Japanese terms in boat race) is expected. (2) In the case of an inner dent where the boat on the inside is late to start immediately after the start of the race, "Makuri" or "Makurisasi" (Japanese terms in boat race) is expected. (3) In the case of a dent in the middle where the boat in the middle is late to start immediately after the start of the race, "Makuri" or "Makurisasi" from the outside is expected. (4) In the case of an outer dent where the boat on the outside is late to start immediately after the start of the race, "Nige" or "Sasi" is expected. Depending on these circumstances, it is possible to determine the time when the order-of-finish determination part of the competitor has reached the front.

In addition, when a competitor with a handicap participates in a race, such as in an auto race, it may be determined whether or not an order-of-finish determination part of the competitor with a handicap has reached the front. In addition, when or after there is a foul at the start, such as flying, or a foul after starting the race, such as obstruction of another competitor, it can be determined whether or not the order-of-finish determination part of the competitor has reached the front. In addition, when it is not possible to determine whether or not the order-of-finish determination part of the competitor has reached the front, it can be set not to start betting in the competition.

The predetermined time can be set to, for example, 10 seconds to 60 seconds from the time when it can be determined whether or not the order-of-finish determination part of any competitor has reached the front. In addition, the predetermined time can be set to be between the time when it can be determined whether or not the order-of-finish determination part of any competitor has reached the front and a time when reaching the 500 m to 1000 m point from the start of the competition. In this manner, the betting time can be set by focusing on a time, such as 10 seconds or 1 minute, or can be set by focusing on the movement of the competitor from the time when the leading competitor passes the 500 m point from the start to the time when the leading competitor passes the 1000 m point thereafter, for example.

The betting time setting unit 34 sets the betting time by setting (1) betting start trigger and (2) betting end trigger at any timing after the start of the race. The user can purchase a betting ticket during the time zone set by (1) and (2) above. The triggers of (1) and (2) can be flexibly set by focusing on the time or changes in running conditions of the competitors and the like, or can be generated automatically. In addition, as the triggers of (1) and (2), a plurality of triggers can be set for one race. As a result, compared with a case where the time is set mechanically, the possibility of making a bet at the timing when the race is exciting increases.

For example, in the case of a horse race, the betting time can be set from (1) 60 seconds after the start of the race to (2) 180 seconds after the start of the race, from (1) time when the leading horse passes the 800 m point to (2) 120 seconds thereafter, or from (1) time when the leading horse passes the 1500 m point to (2) 60 seconds thereafter. In addition, in the case of a boat race, the betting time can be set, for example, from (1) time when the leading boat passes the first corner in the first lap to (2) time when the leading boat passes the starting point at the end of the first lap.

The result prediction unit 35 predicts a race result based on the competition situation. In addition, in order to increase the accuracy rate of the result prediction, a machine learning unit 41 provided in the artificial intelligence unit 39 can predict the result of the race that has started based on the past race information, and the result prediction unit 35 can predict the result of the race based on the predicted information.

The artificial intelligence unit 39 predicts the result of the race that has started based on the past race information, and determines whether or not an order-of-finish determination part of any competitor has reached the front. For example, the artificial intelligence unit 39 acquires past race information, such as weather, climate, course conditions, date and time, competitor condition, odds, and race results, from the data storage unit 33 and learns the acquired past race information to generate teacher data, thereby predicting the result of the race that has started by using artificial intelligence using deep learning and determining whether or not an order-of-finish determination part of any competitor has reached the front. Thus, the artificial intelligence unit 39 serves as a determination unit that determines whether or not an order-of-finish determination part of any competitor has reached the front. In addition, the artificial intelligence unit 39 can set the betting time at the timing when betting becomes popular.

The machine learning unit 41 can perform machine learning by using various artificial intelligence technologies. As the artificial intelligence technologies, for example, it is possible to use machine learning technologies such as neural networks, genetic programming, functional logic programming, support vector machines, clustering, regression, classification, Bayesian networks, reinforcement learning, representation learning, decision trees, and k-means. In addition, deep learning technology can be used as machine learning technology using a neural network.

The payout determination unit 36 determines the odds by changing the odds of the betting ticket over time based on the elapsed time from the start of the race. For example, the payout determination unit 36 changes the odds over time so that the odds decreases as the elapsed time from the start of the race increases.

The determination unit 37 performs various determination processes regarding whether or not the betting time has ended, whether or not the purchase of a betting ticket has been received, and the like.

The refund unit 38 gives a payout (hereinafter, referred to as "refund") based on the odds to the user who purchased the betting ticket that hit the race result.

The data storage unit 33 stores race data, such as past competition information. The data to be stored is, for example, course conditions, weather and temperature, running of horses or bicycles with respect to the odds, and the like.

<1-4. Betting Ticket Purchasing Process after Start of Race>

Figure 4:
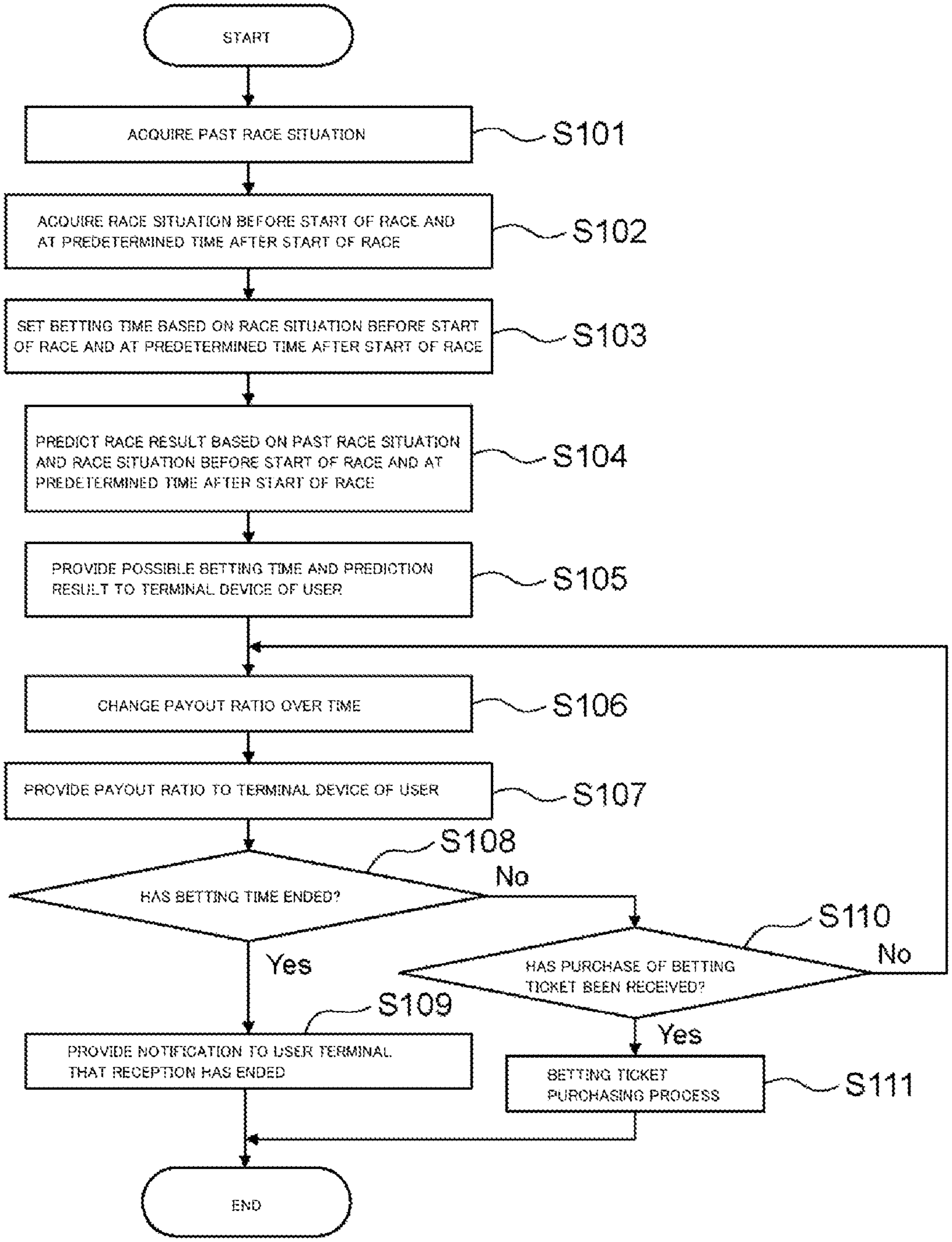
FIG. 4 is a flowchart showing the flow of information processing according to the first embodiment of the present invention.

Next, the flow of a betting ticket purchasing process after the start of the race that is performed by the CPU 21 of the server 3 will be described with reference to FIG. 4. FIG. 4 is a flowchart showing the flow of the betting ticket purchasing process after the start of the race that is performed by the CPU 21 of the server 3. A program for executing the betting ticket purchasing process after the start of the race is stored in advance in a predetermined area of the HDD 24. The betting ticket purchasing process after the start of the race is performed, for example, when the race starts.

First, in step S101, the result prediction unit 35 acquires a necessary race situation related to the current race from the past race information stored in the data storage unit 33.

Then, in step S102, the competition situation acquisition unit 32 acquires a race situation before the start of the race and at a predetermined time after the start of the race received through the communication unit 31.

In step S103, the betting time setting unit 34 sets the betting time based on the race situation before the start of the race and at the predetermined time after the start of the race acquired by the competition situation acquisition unit 32. At this time, for example, a surprise notice such as "betting will start in 10 seconds" can be given shortly after the start of the race. This makes the race and betting more exciting.

In step S104, the result prediction unit 35 predicts the result of the race based on the past race situation and the race situation before the start of the race and at the predetermined time after the start of the race.

In step S105, the communication unit 31 transmits information regarding the betting time set by the betting time setting unit 34 and information regarding the race prediction result predicted by the result prediction unit 35 to the terminal device 4 of the user to provide the user with these pieces of information.

Here, the server 3 can predict the result of the race that has started based on the past race information and set the betting time to increase the user's desire to purchase by using the machine learning unit 41 of the artificial intelligence unit 39. In this case, the prediction result of the race predicted by the machine learning unit 41 and the information regarding the betting time set by the machine learning unit 41 are transmitted to the result prediction unit 35 and the betting time setting unit 34, respectively.

In addition, the odds, for example, basically gradually decrease with time, but a high payout can be set only during the set betting time. This increases the user's enjoyment of purchasing the betting ticket, so that the user's desire to purchase the betting ticket can be increased and the effect of making the race more exciting can be expected. In addition, the winning odds at the set betting time may be determined based on the betting before the start of the race, or may be determined based only on the betting during the betting time set separately from the betting before the start of the race.

Then, in step S106, the payout determination unit 36 determines the odds by changing the odds of the betting ticket over time based on the elapsed time from the start of the race.

In step S107, the communication unit 31 transmits information regarding the odds determined by the payout determination unit 36 to the terminal device 4 of the user to provide the user with the information.

Thereafter, in step S108, the determination unit 37 determines whether or not the set betting time has ended. If the set betting time has ended (Yes), the process proceeds to step S109, and if the set betting time has not ended (No), the process proceeds to step S110.

If the betting time has ended, the communication unit 31 transmits the fact that the betting time has ended to the terminal device 4 of the user in step S109, and ends the betting ticket purchasing process.

If the betting time has not ended, the betting ticket purchase receiving unit 40 determines whether or not the purchase of a betting ticket from the user through the terminal device 4 has been received in step S110. If the purchase of a betting ticket has been received (Yes), the process proceeds to step S111, and if the purchase of a betting ticket has not been received (No), the process returns to step S106.

If the purchase of a betting ticket has been received, the betting ticket purchase receiving unit 40 checks the communication log from the user to perform the betting ticket purchasing process in step S111, and ends the betting ticket purchasing process. The betting ticket purchasing process is a process up to settlement for the purchased betting ticket by the user after the user ID of the user who purchased the betting ticket, the type of the purchased betting ticket, the number of the purchased betting tickets, the odds based on the time of betting (elapsed time from the start of the race), and the like are stored in the HDD 24 of the server 3.

<1-5. Betting Time Setting of Betting Time Setting Unit>

Figure 5:
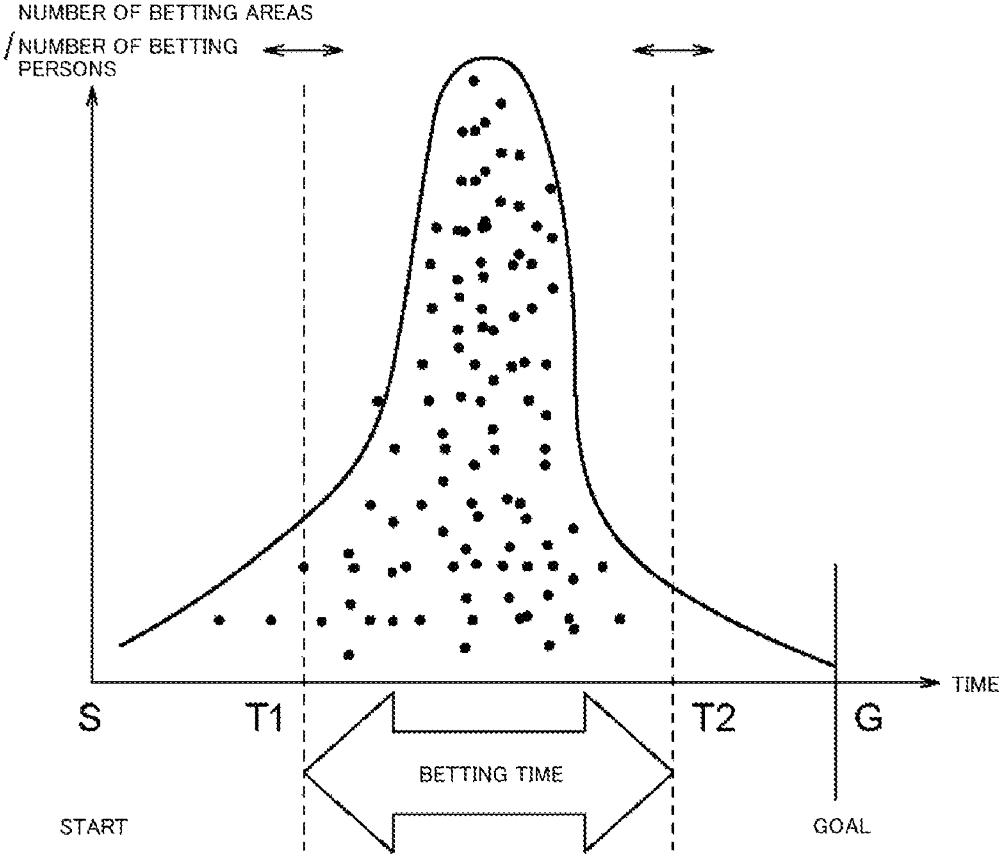
FIG. 5 is a diagram illustrating the setting of the betting time by a betting time setting unit according to the first embodiment of the present invention.

Next, setting of the betting time by the betting time setting unit 34 according to the present embodiment will be described with reference to FIG. 5. FIG. 5 is a diagram for explaining the setting of the betting time by the betting time setting unit 34 according to the present embodiment.

Conventionally, only the end time of the betting time was set. Therefore, it was possible to make a bet at any time between before the start of the race and the set end time. In addition, by dividing the race into four time segments based on time as disclosed in US Patent Application Publication No. 2008/0139263, it was possible to make a bet in any or all of the time segments during the race.

However, immediately after the start of the race, a plurality of competitors may be lumped together and their rankings may not be clear, and depending on a competition such as a bicycle race, the competition between competitors may be accelerated after the middle stage of the race. In these cases, there is a possibility that the user's concentration or sense of immersion in watching the competition may be reduced before the user's desire to purchase the betting ticket increases, and as a result, the user's desire to purchase may decrease. In addition, the betting time may be closed before the race reaches a highlight. As described above, in the past, the time zone in which the desire to purchase increases is eventually included in the betting time. This is different from increasing the desire to purchase by setting the start time and the end time of the betting time.

On the other hand, as shown in FIG. 5, in the betting time setting unit 34 according to the present embodiment, a time zone that will be the highlight of the race, such as a scene that decides the outcome of the race, that is, a time zone in which the number of betting persons is expected to increase, is analyzed based on the race situation, and both the start time T1 and the end time T2 of the betting time are set in the time zone. Specifically, after the start of the race, a betting start trigger and a betting end trigger from the time when it can be determined whether or not an order-of-finish determination part of any one of a plurality of competitors has reached the front to a predetermined time is set, so that the betting time is set based on the competition situation.

In this manner, the betting time setting unit 34 allows betting only within the betting time between the start time T1 and the end time T2, which can be determined for the first time based on the race situation after the start of the race, rather than based on the positions or times determined in advance before the start of the race. Therefore, it is possible to increase the user's desire to purchase the betting ticket by making the user pay attention to the scene that will be the highlight of the race.

According to the above-described information processing system 1 using the server 3 according to the present embodiment, it is possible to flexibly set the betting time at the timing when the race becomes exciting after the start of the race. Therefore, after the start of the race, the user can purchase the betting ticket at the timing when the desire to purchase increases according to the race situation.

In addition, according to the information processing system 1, the result prediction unit 35 predicts the result based on the actual race situation and the past race information, so that the user can instantly predict the result even after the start of the race. Therefore, the user can purchase the betting ticket quickly. In addition, since the server 3 changes the odds of the betting ticket over time based on the elapsed time from the start of the race, it is possible to increase merits and demerits of purchasing the betting ticket while increasing the desire to purchase the betting ticket by predicting the order of finish after the start of the race.

In addition, according to the information processing system 1, it is possible to predict the race result based on the actual race situation before betting. Therefore, it is possible to reduce the risk of gambling or to easily eliminate match-fixing, such as collusion of the parties involved before the start of the race or intentionally manipulating the ranking of a specific competitor. These enable the sound development of public competitions.

In addition, according to the information processing system 1, the user is more likely to miss the timing to bet if the user does not watch the actual race. Therefore, the user actively watches the race at the race venue or the live-streamed race. In addition, even if the competitor on which the user bet before the start of the race is not in good condition or the possibility of a high-ranking prize disappears early in the race, it is possible to change the betting target and continue watching the race. In addition, it is possible to bet on even a competitor with low evaluations before the start of the race if the running is good after the start of the race. In addition, when the reliability of advance information (for example, information from newspaper and the like such as odds and the condition of competitors) decreases due to worsening conditions (when affected by strong rain, wind, snow, or the like) and accordingly the risk of pre-betting is high, it is possible to make a bet after the start of the race. As a result, since the number of people watching the races and the number of people who make bets can be increased, it is possible to further activate public competitions.

In addition, according to the information processing system 1, by storing data on the past race situation and setting the timing of active betting, such as the highlight of the race, as a betting time, it is possible to make public competitions more exciting than before. For example, in an auto race that runs 8 laps of the course, if there were a lot of bets between the third and fourth laps according to past betting situation data, it is possible to set the betting time with the time when the leading bike enters the third lap as the betting start time.

Second Embodiment

Hereinafter, a second embodiment of the present invention will be described with reference to FIG. 1.

The information processing system 1 using the server 3 can distribute the video of the race to the terminal device 4 of the user. When distributing the video, for example, it is possible to implement betting with an additional tipping function, such as a super chat function. For example, in the case of a horse race, the user makes tipping to support a horse, such as a horse for which the user has predicted the winner or a favorite horse, and this tipping itself becomes betting. Then, the user who has made the tipping can receive benefits such as chat information, which is written about the horse for which the tipping has been made, being displayed in a more close-up manner than other users.

According to the information processing system 1 of the present embodiment, in addition to the effect of the first embodiment, the user can not only make tipping but also receive a payout if the prediction is correct. Therefore, the user enjoys watching the race more. In addition, the user can feel a sense of unity among fans who have bet on the same competitor, such as the same horse, by supporting the competitor. In addition, on the management side, since the community is excited to increase the number of bets, public competitions can liven up.

In addition, the present invention can be applied not only to races in which actual competitors run but also to virtual races such as online or offline horse racing games.

The present invention can have the following configurations.

(1) An information processing device including:

a competition situation acquisition unit that acquires a competition situation before and after the start of a competition between a plurality of competitors;

a betting time setting unit that sets a betting time by setting a betting start trigger and a betting end trigger from a time when it is determined whether or not an order-of-finish determination part of any one of the plurality of competitors has reached a front to a predetermined time after the start of the competition; and a betting ticket purchase receiving unit that receives a purchase of a betting ticket within the set betting time.

(2) The information processing device described in (1), in which the predetermined time is 10 seconds to 60 seconds from the time when it is determined whether or not the order-of-finish determination part of any competitor has reached the front.

(3) The information processing device described in (1), in which the predetermined time is between the time when it is determined whether or not the order-of-finish determination part of any competitor has reached the front and a time when reaching a 500 m to 1000 m point from the start of the competition.

(4) The information processing device described in any one of (1) to (3), further including: a result prediction unit that predicts a result of the competition based on the competition situation.

(5) The information processing device described in (4), further including: a communication unit that transmits a prediction result of the result prediction unit to a terminal device of a betting person.

(6) The information processing device described in any one of (1) to (5), further including: a payout determination unit that determines a payout ratio by changing the payout ratio of the betting ticket over time based on an elapsed time from the start of the competition.

(7) The information processing device described in any one of (1) to (6), further including:

a data storage unit that stores past competition information; and an artificial intelligence unit that predicts a result of the competition that has started based on the past competition information and determines whether or not the order-of-finish determination part of any competitor has reached the front.

(8) An information processing method including:

a competition situation acquisition step for acquiring a competition situation before and after the start of a competition between a plurality of competitors;

a betting time setting step for setting a betting time by setting a betting start trigger and a betting end trigger from a time when it is determined whether or not an order-of-finish determination part of any one of the plurality of competitors has reached a front to a predetermined time after the start of the competition; and a betting ticket purchase receiving step for receiving a purchase of a betting ticket within the set betting time.

(9) A non-transitory computer readable medium including computer program causing a computer to execute an information processing method including:

a competition situation acquisition step for acquiring a competition situation before and after the start of a competition between a plurality of competitors;

a betting time setting step for setting a betting time by setting a betting start trigger and a betting end trigger from a time when it is determined whether or not an order-of-finish determination part of any one of the plurality of competitors has reached a front to a predetermined time after the start of the competition; and a betting ticket purchase receiving step for receiving a purchase of a betting ticket within the set betting time.

EXPLANATIONS OF LETTERS OR NUMERALS

1 information processing system
2 network
3 server (information processing device)
4 terminal device
20 system bus
21 CPU
22 ROM
23 RAM
24 HDD
25 input unit
26 display unit
31 communication unit
32 competition situation acquisition unit
33 data storage unit
34 betting time setting unit
35 result prediction unit

36 payout determination unit
37 determination unit
38 refund unit
39 artificial intelligence unit
40 betting ticket purchase receiving unit
41 machine learning unit

What is claimed is:

1. An information processing device, comprising:

a processor; and a memory storing past competition information, wherein the processor includes:

a competition situation acquisition unit that acquires a competition situation before and after a start of a competition between a plurality of competitors;

a betting time setting unit that sets a betting time by flexibly setting a betting start trigger and a betting end trigger at any timing after the start of the competition;

a betting ticket purchase receiving unit that receives a purchase of a betting ticket within the set betting time; and an artificial intelligence unit that predicts a result of the competition that has started based on the past competition information and determines whether or not a part of any one of the plurality of competitors has reached a front which is a point in time when an order of the competitors is temporarily determined, wherein a time zone in which a number of betting persons is expected to increase is analyzed based on the competition situation after the start of the competition and the result of the competition predicted by the artificial intelligence unit, and in the time zone, the betting start trigger is set as a start time, and the betting end trigger is set as an end time in a predetermined time from the start time.

2. The information processing device according to claim 1, wherein the predetermined time is 10 seconds to 60 seconds from the time when it is determined whether or not the part of any one of the plurality of competitors has reached the front.

3. The information processing device according to claim 1, wherein the predetermined time is between the time when it is determined whether or not the part of any one of the plurality of competitors has reached the front and a time when reaching a 500 m to 1000 m point from the start of the competition.

4. The information processing device according to claim 1, wherein the processor further includes a result prediction unit that predicts a result of the competition based on the competition situation.

5. The information processing device according to claim 4, wherein the processor further includes a communication unit that transmits a prediction result of the result prediction unit to a terminal device of a betting person.

6. The information processing device according to claim 1, wherein the processor further includes a payout determination unit that determines a payout ratio by changing the payout ratio of the betting ticket over time based on an elapsed time from the start of the competition.

7. An information processing method processed by an information processing device including a processor and a memory, the information processing method comprising:

acquiring a competition situation before and after a start of a competition between a plurality of competitors by the processor;

setting a betting time by flexibly setting a betting start trigger and a betting end trigger at any timing after the start of the competition by the processor;

receiving a purchase of a betting ticket within the set betting time by the processor;

storing past competition information in the memory; and by using an artificial intelligence of the processor, predicting a result of the competition that has started based on the past competition information and determining whether or not a part of any one of the plurality of competitors has reached a front which is a point in time when an order of the competitors is temporarily determined, wherein a time zone in which a number of betting persons is expected to increase is analyzed based on the competition situation after the start of the competition and the result of the competition predicted by the artificial intelligence, and the betting start trigger is set as a start time, and the betting end trigger is set as an end time in a predetermined time from the start time.

8. The information processing device according to claim 2, wherein the processor further includes a result prediction unit that predicts a result of the competition based on the competition situation.

9. The information processing device according to claim 3, wherein the processor further includes a result prediction unit that predicts a result of the competition based on the competition situation.

10. The information processing device according to claim 1, wherein as the betting start trigger and the betting end trigger, a plurality of triggers are set in one competition.

* * * * *